Dec. 9, 1958    C. B. SPASE    2,863,545
TORQUE METERING CLUTCH

Filed Sept. 5, 1957    2 Sheets—Sheet 1

Fig-1-

INVENTOR.
Charles B. Spase.
BY
D. Emmett Thompson
ATTORNEY.

United States Patent Office 2,863,545
Patented Dec. 9, 1958

2,863,545

TORQUE METERING CLUTCH

Charles B. Spase, Syracuse, N. Y., assignor to Lipe-Rollway Corporation, Syracuse, N. Y., a corporation of New York Application September 5, 1957, Serial No. 682,244

5 Claims. (Cl. 192—104)

This invention has as an object and relates to torque metering clutches of the type used in connection with automotive vehicles. Due to the present day high speeds of automotive engines it is necessary to limit the torque which is transmitted from the engine to certain of the accessories used in automotive vehicles, in order to prevent faulty or improper operation of the accessories which would occur due to the high speed at which the accessories would be rotated by the high engine speeds.

One method of preventing such high speeds from being transmitted to the accessories is to meter the torque which is transmitted from the engine to the accessory through a friction type clutch. These clutches consist of a driving member which is connected in a direct or indirect fashion to the engine crankshaft and a driven member which has a frictional driving engagement with the driving member. At a predetermined speed slip will take place between the driving and driven members thereby limiting the amount of torque that the driving member transmits to the driven member, the driven member in turn being connected to the accessory which would operate improperly and even dangerously if connected directly to the engine crankshaft.

Accordingly, it is an object of this invention to provide a simple, inexpensive torque metering clutch of a small, compact, size which may be utilized in connection with existing automotive vehicle structures so that the clutch may be inserted in the vehicle without necessitating any change in the positioning or spacing of the parts of the vehicle.

It is a further object of this invention to provide a torque metering clutch having new and unique means for dissipating the heat generated in the clutch by the friction drive in order to prevent such heat from damaging or harming the clutch.

The invention consists in the novel features and in the combinations and constructions hereinafter set forth and claimed.

In describing this invention, reference is had to the accompanying drawings in which like characters designate corresponding parts in all the views.

In the drawings—

Figure 1:
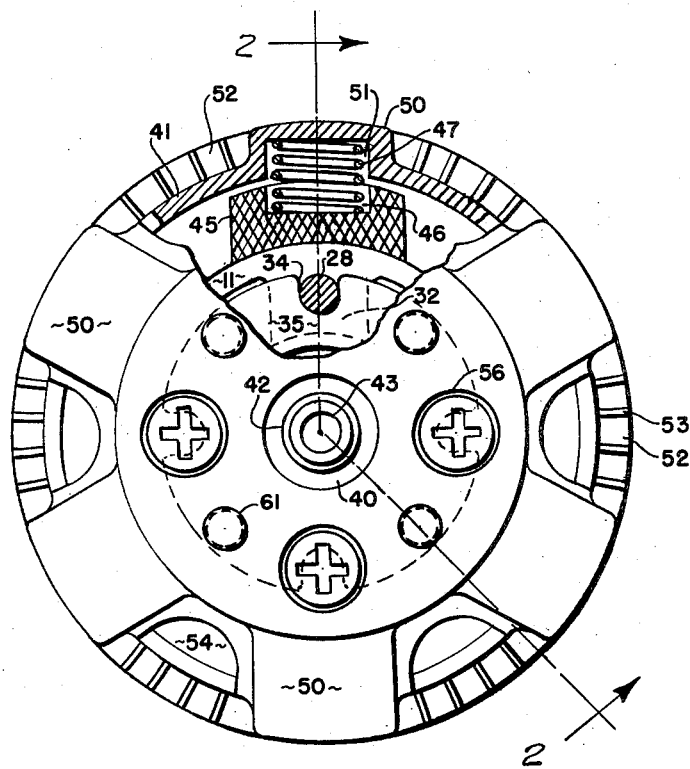
Figure 1 is a front elevational view of the invention shown partly broken away and with portions omitted for the purpose of clarity; showing the invention in an exemplary installation.
Figure 2:
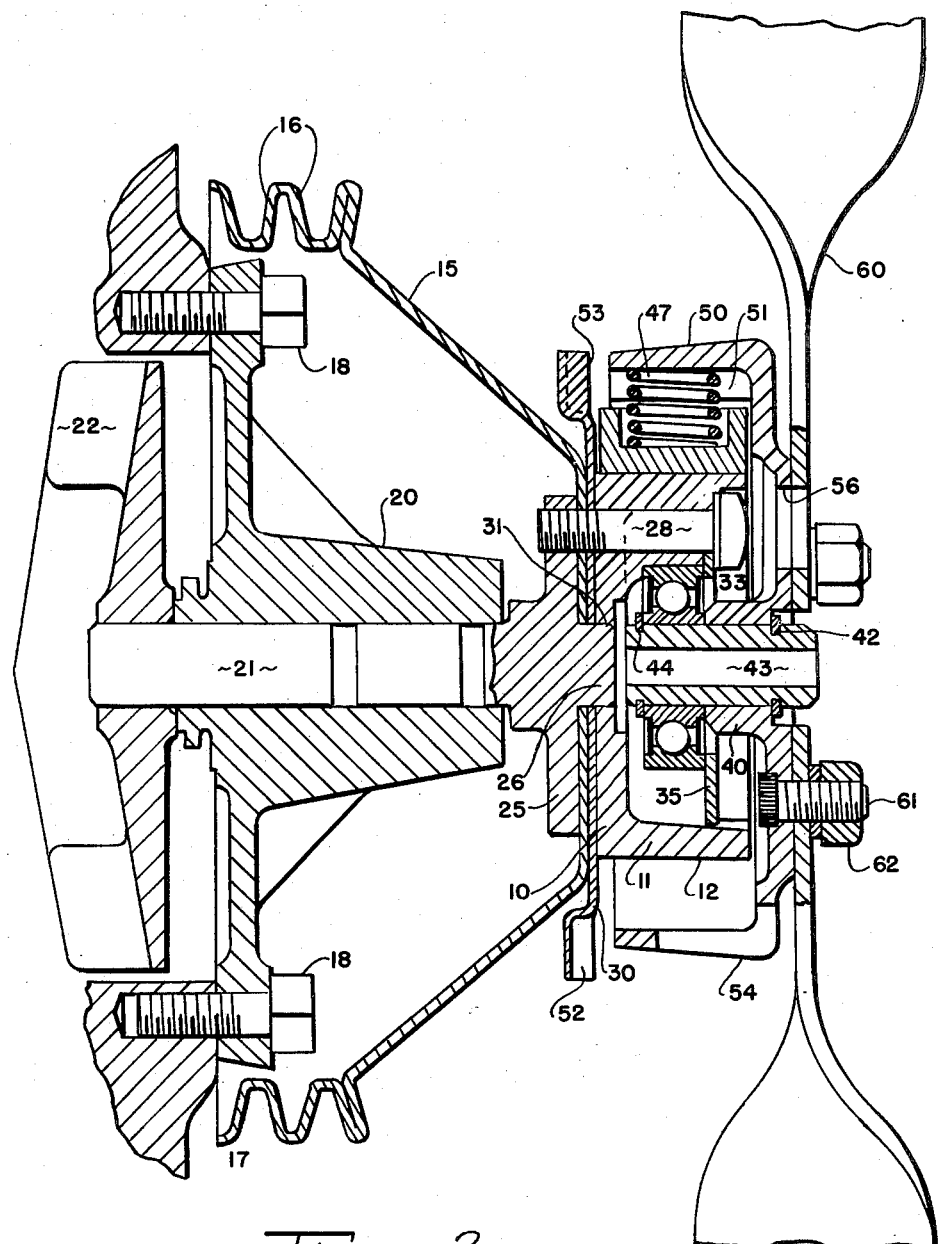
Figure 2 is a cross section taken on line 2—2 of Figure 1.

The torque metering clutch has been illustrated in connection with a radiator cooling fan of the type well known in the art. A torque metering clutch of the type previously described must be used in connection with such fans to prevent the fan from operating at too great a speed which would cause "cavitation" and thus improper operation of the fan.

In the present day automotive vehicles the fan has been spaced forwardly on the water pump shaft in order to position the fan more closely adjacent to the radiator so that a greater quantity of air is drawn through the radiator by the fan, thereby increasing the cooling efficiency in the radiator. Consequently, any torque metering clutch must be placed intermediate the rear side of the fan and the forward position of the water pump shaft and this space is of relatively small width and therefore, the torque metering clutch must be small enough to be positioned within the space but yet must still be effective to meter the torque transmitted to the fan.

As shown in the drawings the torque metering clutch is made up of a driving member having a discoidal portion 10 which terminates in an annular flange 11 so as to form a friction drum surface 12.

A driver 15 having a pair of pulley sheaves 16 for effecting a connection between the driver and the crankshaft of an automotive vehicle is utilized to rotate the driving member. Mounted on the water pump outer wall 17 by means of fasteners 18 is a bearing 20 which supports the water pump shaft 21, on one end of which is mounted the pump impeller 22. The other end of the pump shaft 21 terminates in a circular plate 25 having a locator hub 26 formed on its outer surface. The driver 15 is connected to the driving member and the pump shaft 21 by means of a plurality of fasteners 28 which extend through the discoidal portion of the driving member. A coolant member 30 is positioned intermediate the driver 15 and the discoidal portion 10 of the driving member for a purpose hereinafter described. The hub 26 on the plate 25 forms a locator for the central aperture 31 of the driving member.

The driving member is formed with a plurality of radially inwardly extending bosses 32, shown in hidden lines in Figure 1, which form a bearing surface for the bearing 33. The fasteners 28 extend through notches 34 formed in a retaining washer 35 and through apertures in the bosses 32 so as to fix the washer 35 and consequently the bearing 33 in a position to prevent the bearing from moving axially outwardly.

The driven member is formed with a central hub 40 and terminates in an annular inwardly extending flange 41 positioned in spaced concentric relation to the drum surface 12. Mounted in the hub 40 by means of a snap ring 42 is a stub shaft 43, and the inwardly extending end of the stub shaft is journalled in the bearing 33 and is prevented from moving axially outwardly from the bearing 33 by means of a snap ring 44.

Mounted in the space between the drum surface 12 on the driving member and the annular flange 41 on the driven member are a plurality of friction shoes 45 which are arcuate shaped and normally engage the drum surface 12. The shoes 45 are formed with a radial recess 46 on their outer surface for the reception of compression springs 47.

As best seen in Figure 1 the annular flange 41 on the driven member is formed with a plurality of circumferentially spaced radially outwardly extending pockets or bosses 50 which are recessed as at 51 to provide cavities which are in radial alignment with the recesses 46 formed in the friction shoes 45. The compression springs 47 are mounted in the recesses 46 and 51 and normally yieldably urge the shoes 45 into frictional engagement with the drum surface 12 so as to provide frictional driving engagement between the driving and driven member when the driving member is rotated.

When the driving member reaches a certain predetermined speed centrifugal force acting on the shoes 45 and the springs 47 will exert a force in opposition to the springs 47 so as to decrease the amount of frictional engagement that the shoes 45 have with the drum surface 12 thus permitting slippage to take place between the shoes and the drum surface thereby metering the torque transmitted from the driving member to the driven member.

The slippage taking place between the shoes 45 and the surface 12 causes frictional heat to be generated in the driving member. Coolant member 30 is formed of a material having a high heat conductivity such as aluminum or the like, and due to the large area of contact between the discoidal portion 10 of the driving member and the coolant member 30, the heat generated in the driving member is transferred by conduction to the coolant member 30. The coolant member is formed around its periphery with a series of radial grooves 52 and ridges 53 thereby increasing the total peripheral area of the member 30.

The peripheral edge 41 of the driven member is formed with a plurality of notched apertures 54 intermediate the bosses 47. These apertures communicate with the grooves and ridges 52, 53 formed on the periphery of the coolant member 30. The radiator fan 60, mounted on the driven member, causes an air flow through the apertures 54 past the edges and grooves and ridges 52, 53 whereby the heat generated in the driving member which is transferred by conduction to the center of the coolant member 30 and from there to the ridges and grooves, where the air flow dissipates the heat radiated by the ridges and grooves. Consequently, the frictional heat generated in the driving member is constantly dissipated by the coolant member 30 which acts as a "heat pump," thereby preventing any faulty operation from occurring in the unit due to overheating.

The springs 47 form the drive connectors between the driving and driven members and the shoes are prevented from creeping circumferentially with respect to the flange 41 by reason of the fact that the outer end of the spring 47 is received in the recess 51 and the inner end of the spring is received in the recess 46 formed in the shoes 45.

The driven member is provided with a plurality of circumferentially spaced apertures 56 which permit the fasteners 28 to be inserted into the unit to mount it on the plate 25.

Fan 60 is mounted on the driven member by means of fasteners 61, 62. As will be obvious, due to the fact that the torque transmitted from the driver 15 to the fan 60 is limited or metered by the torque metering clutch, no horsepower will be wasted in rotating the fan 60. Further, this insures quieter operation of the fan since it would create objectional noise if rotated at excessive speeds. In addition, the heat pump 30 insures that the heat generated in the clutch will be dissipated by the air flow set up by fan 60 whereby such heat will not harm or damage the clutch.

What I claim is:

1. In combination, a water pump shaft adapted to have its outer end closely spaced behind a radiator and having a plate thereon and a locator hub extending forwardly of said plate, a sheave having a discoidal portion with a central hole placed over said locator hub with said discoidal portion in contact with the plate of the water pump shaft, a clutch assembly comprising a driving member having a discoidal portion with a hole centrally thereof placed on the locator hub with the discoidal portion in contact with the plate and an annular flange forming an exterior friction drum surface, radially inwardly extending boss means interiorly of said annular flange forming a bearing surface, said boss means and discoidal portion having an axially extending hole therethrough, a fastening member extending through said hole and aligned holes in the plate of the water pump shaft and the discoidal portion of the sheave and the driving member, a bearing carried by said bearing surface and supporting interiorly thereof a stub shaft, said stub shaft being part of a driven member comprising said stub shaft, a discoidal portion connected thereto and an annular flange in spaced concentric relation to the friction drum surface of the driving member, friction shoes in the space between said flanges and urged towards said friction drum by spring means bearing thereagainst and against the annular flange of said driven member, fastening means extending from the discoidal portion of the driven member and a fan secured thereto by said fastening means.

2. The combination of claim 1, and further comprising an annular heat transfer plate between and in contact with the discoidal parts of said sheave and said driving member, said heat transfer plate extending outwarly beyond the annular flange of the driving member, said driven member having aperture means therein to permit air to flow therethrough into the space between said annular flanges and against said heat transfer plate.

3. A torque metering clutch adapted to be assembled onto a water pump shaft having its outer end closely spaced behind a radiator and having a plate thereon and a locator hub extending forwardly of said plate, said clutch comprising a clutch assembly comprising a driving member having a discoidal portion with a hole centrally thereof adapted to be placed on the locator hub with the discoidal portion adjacent the plate and an annular flange forming an exterior friction drum surface, radially inwardly extending boss means interiorly of said annular flange forming a bearing surface, said boss means and discoidal portion having an axially extending hole therethrough adapted to receive a fastening member for securing together the plate of the water pump shaft and discoidal portion of the driving member, a bearing carried by said bearing surface and supporting interiorly thereof a stub shaft, said stub shaft being part of a driven member comprising said stub shaft, a discoidal portion connected thereto and an annular flange in spaced concentric relation to the friction drum surface of the driving member, friction shoes in the space between said flanges and urged towards said friction drum by spring means bearing thereagainst and against the annular flange of said driven member, said discoidal portion of said driven member adapted to have a fan secured thereto.

4. The structure of claim 3, and further comprising an annular heat transfer adjacent and in contact with the discoidal portion of said driven member and extending outwardly thereof, said driven member having aperture means therein to permit air to flow therethrough into the space between said annular flanges and against said heat transfer plate.

5. The structure of claim 3, and apertures in the discoidal portion of said driven member at the same distance from the axis of rotation of said clutch as the hole in said boss means and discoidal portion of said driving member.

References Cited in the file of this patent
UNITED STATES PATENTS

| | | |
|---|---|---|
| 2,506,520 | Spase | May 2, 1950 |
| 2,554,874 | Oetzel | May 29, 1951 |
| 2,678,031 | Spase et al. | May 11, 1954 |
| 2,785,781 | Johansen | Mar. 19, 1957 |

OTHER REFERENCES

"Automotive Industries," Oct. 1, 1954, pages 54 and 55. (Copy in Division 24.)